United States Patent [19]

Hirano

[11] Patent Number: 4,527,646

[45] Date of Patent: Jul. 9, 1985

[54] COMBINATION WEIGHING MACHINE

[75] Inventor: Takashi Hirano, Kobe, Japan

[73] Assignee: Yamato Scale Company, Limited, Hyogo, Japan

[21] Appl. No.: 476,053

[22] Filed: Mar. 17, 1983

[51] Int. Cl.$^3$ .................... G01G 19/22; G01G 19/52
[52] U.S. Cl. ........................................ 177/25; 177/50
[58] Field of Search .................. 177/25, 1, 567, 15, 177/19, 50; 364/567

[56] References Cited

U.S. PATENT DOCUMENTS

| | | |
|---|---|---|
| 3,939,928 | 2/1976 | Murakami et al. ................... 177/25 |
| 4,267,894 | 5/1981 | Hirano et al. ........................ 177/25 |
| 4,308,928 | 1/1982 | Oshima ................................ 177/25 |
| 4,313,507 | 2/1982 | Hays ................................... 177/25 |
| 4,336,852 | 6/1982 | Hirano ................................ 177/25 |
| 4,336,853 | 6/1982 | Hirano ................................ 177/25 |
| 4,341,274 | 7/1982 | Hirano et al. ........................ 177/25 |
| 4,344,492 | 8/1982 | Hirano ................................ 177/25 |
| 4,360,070 | 11/1983 | Hirano ................................ 177/25 |
| 4,397,364 | 8/1983 | Hirano ................................ 177/25 |

Primary Examiner—E. A. Goldberg
Assistant Examiner—Fred L. Kampe
Attorney, Agent, or Firm—Senniger, Powers, Leavitt and Roedel

[57] ABSTRACT

An automatically controlled combination weighing machine, which is generally used for packing a plurality of articles in each bag or the like so that each bag contains a predetermined weight of articles, comprising a plurality of weighing units for weighing a plurality of articles each at the same time to produce corresponding weight indicative signals, respectively, artihmetic means for selecting some of these weighing units so that the total weight of the articles on the selected weighing units meets a predetermined qualification, and means for unloading and loading the selected weighing units with articles automatically; an improvement of which is a provision of automatic control means for the loading means for controlling the feeding rate or amount of articles to the unloaded weighing units on the basis of the total weight of the articles in the all weighing units so that this total weight is maintained at or close to a predetermined value.

10 Claims, 4 Drawing Figures

COMBINATION WEIGHING MACHINE

This invention relates to an improvement in combination weighing machine of the invention having automatic article loading means.

The weighing machine, which is generally referred to as a "combination balance", "combination weighing device" or "combination weighing machine", is used for extracting a plurality of articles from a group of articles, such as candies, fruits and vegetables, having relatively large variance in respective weights, to form a sub-group having a total weight which meets a predetermined qualification, for example, which falls within a predetermined range of weight. Typical examples of such machine are disclosed in U.S. Pat. Nos. 3,939,928 and 4,267,894 which are cited herein as references. In these devices, a plurality of articles are weighed individually by a plurality of weighing units or balances at the same time, all mathematical combinations of the measured weights are summed respectively and the resultant total weights are successively compared with a predetermined weight qualification. Thus, the combination providing a total weight which meets the qualification is selected for use.

Automatically controlled combination weighing machines are generally provided with automatic article loading and unloading means for discharging the articles from the selected weighing units for packing and, then, feeding new articles thereto. The loading means generally comprises a vibration feeder having a plurality of exit gates, as described later, and the article feeding rate can be controlled by changing the opening time of the gates or the amplitude of vibration of the feeder.

As described in the copending U.S. patent application Ser. No. 277,617 filed June 26, 1981 in the name of the present inventor, now U.S. Pat. No. 4,397,364 the most accurate selection providing the total weight of articles which is nearest to the predetermined target weight can be expected if half of the weighing units are selected out every cycle of operation. For example, when a specific combination weighing machine includes eight (8) weighing balances, the total number of combinations obtained from these balances must be $2^8 - 1$, that is, 255. However, the desired combinations are only a very little part of these combinations and the number of them depends upon the reference weight and the weight of articles on each balance. Assuming that the reference weight is 500 grams and each balance carries articles weighing a little more or less than 100 grams, the desired combination will be composed of five balances and the number of such combinations will be $_8C_5 = 56$ by the teaching of mathematics. However, assuming that the reference weight is unchanged but the weight of articles on each balance is about 250 grams, the desired combination will involve only two balances and the number of combinations will be $_8C_2 = 28$ only. According to the theory of probability, there should be a better chance to obtain a combination having total weight which is nearest the reference weight, when one selects it from the larger number of combinations. In the above example, there is higher probability in $_8C_5$ than in $_8C_2$ and the highest probability is obtained from the combinations $_8C_4 = 70$ which is the largest number of combinations obtained in this machine.

In general, when a combination weighing machine includes n-number of weighing balances, the largest number of combinations can be obtained when each combination involves n/2 balances where n is even, or $(n/2) \pm 0.5$ balances where n is odd. Accordingly, the best chance can be obtained to obtain the optimum combination in this case. In the cited patent, means is provided for counting the number of selected weighing units every cycle and controlling the article feeding rate on the basis of deviation of the counted number from the desired "half number". However, the counting means of the cited arrangement requires a relatively complicated circuit arrangement which renders the arrangement substantially expensive.

Accordingly, an object of this invention is to provide an improved combination weighing machine having a simpler and more economical arrangement for controlling the article feeding rate so as to maintain the above-mentioned "half number" condition.

If the selected optimum combinations exhibiting total weights equal or close to the target weight are composed always of a half of the weighing units, it can be expected that the total weight of all the weighing units is maintained at about twice the target weight. The present invention is based upon this principle.

According to a feature of this invention, there is provided a combination weighing machine including automatic article loading means, means for producing a total weight of all the weighing units when all of them have been loaded properly, means for comparing the total weight with a predetermined reference weight to produce a correction signal based upon the difference therebetween, and means for controlling the feeding rate of the article loading means in response to the correction signal.

These and other objects and features of this invention will be described in more detail hereinunder with reference to the accompanying drawings.

In the drawings.

Throughout the drawings, the same reference numerals are given to corresponding components.

Figure 1:
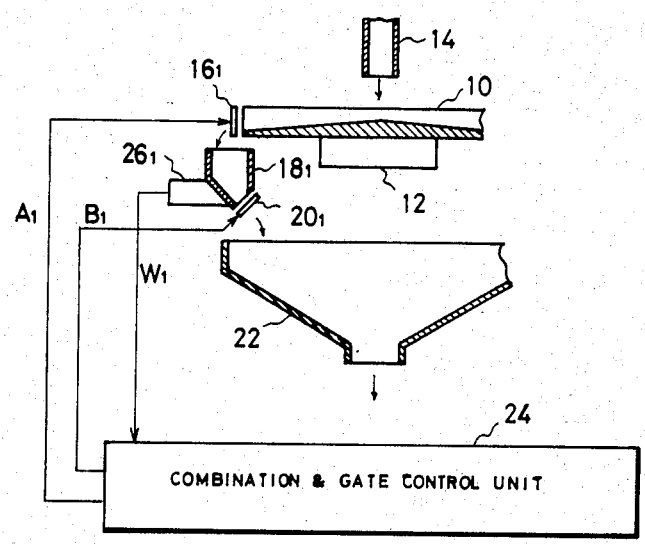
FIG. 1 is a schematic diagram representing a mechanical arrangement of a combination weighing machline in which this invention is embodied.

Referring to FIG. 1, there is shown a schematic view of a mechanical arrangement of a typical automatic combination weighing machine in which this invention is embodied. The machine includes a vibration feeder 10 having a slightly conical bottom wall and a peripheral side wall. The feeder 10 is provided with a vibrator 12 for applying vibration to the bottom wall so that articles supplied from a central chute 14 are shifted outwards to the peripheral portion. The peripheral wall of the feeder 10 has a plurality of exit ports having a gate $16_1$ each. The suffix "1" is given for indicating that component belonging to the first weighing unit, while the remaining units are omitted from the drawing for simplification. The gate $16_1$ is normally closed and selectively opened under control of loading signal $A_1$ from a combination and gate control unit 24 as described later. The machine also includes a plurality of weighing units surrounding the feeder 10 so that their weighing cradles 18 are disposed respectively just under the exit ports of the feeder 10. It is understood that the articles on the feeder 10 are fed into each weighing cradle $18_1$ when the corresponding gate $16_1$ is opened. Each weighing cradle $18_1$ has a bottom opening having a gate $20_1$ which is normally closed and selectively opened under control of unloading signal $B_1$ from the combination and gate control unit 24 as also described later. Each weighing unit also includes a weight sensor $26_1$, such as a load cell, which produces an electric signal $W_1$ indicative of the weight of articles in the cradle $18_1$ and supplies it to the combination and gate control unit 24. Under the unloading gates 20 of the respective weighing cradles 18, a common collecting hopper 22 is disposed for collecting the articles discharged from the selected weighing units. The articles collected in the hopper 22 and discharged from its bottom opening are transferred by suitable means (not shown) for packing.

Figure 2:
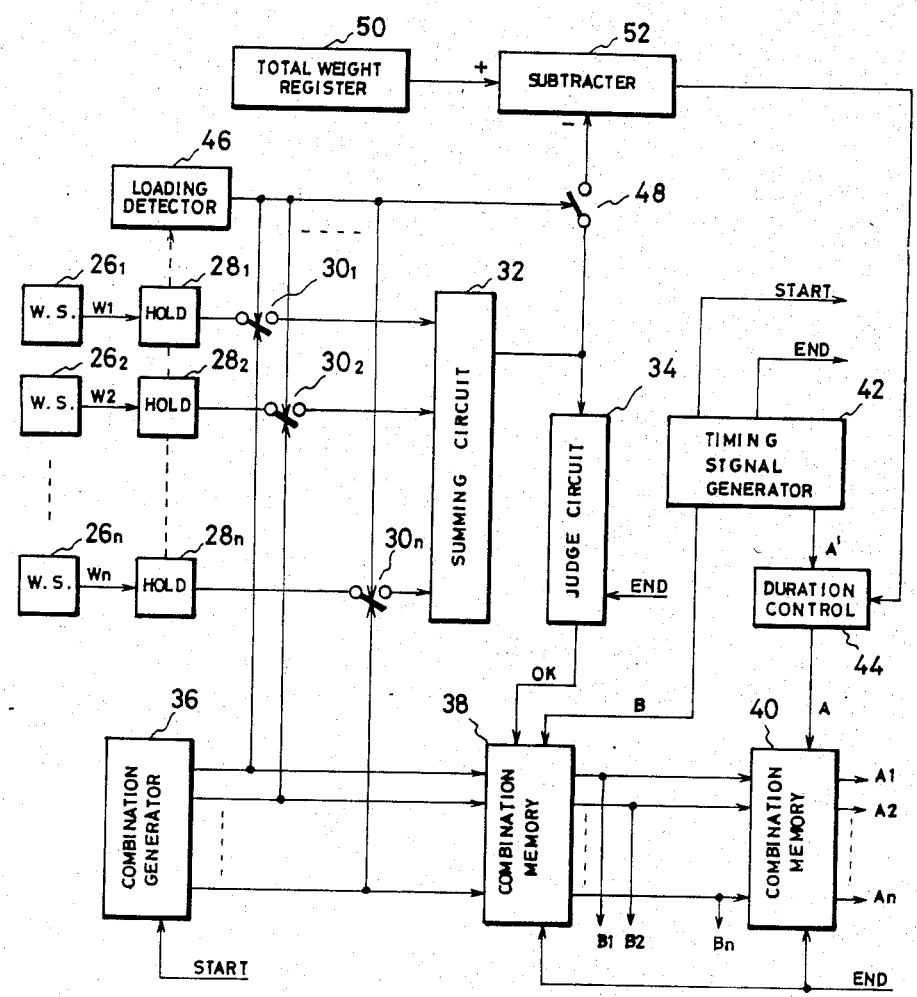
FIG. 2 is a block diagram representing a circuit configuration of an embodiment of a combination weighing machine according to this invention.

FIG. 2 shows a typical circuit configuration of the combination and gate control unit 24 of FIG. 1, in which this invention is embodied. The output weight indicative signals $W_1, W_2, \ldots W_n$ of weight sensors $26_1$, $26_2, \ldots 26_n$ are held temporarily in holding circuits $28_1$, $28_2, \ldots 28_n$ and coupled through normally-open switches $30_1, 30_2, \ldots 30_n$ to a common summing circuit 32, respectively. The summing circuit 32 serves to sum the incoming signals and supply the resultant total weight indicative signal to a judging circuit 34.

Figure 3:
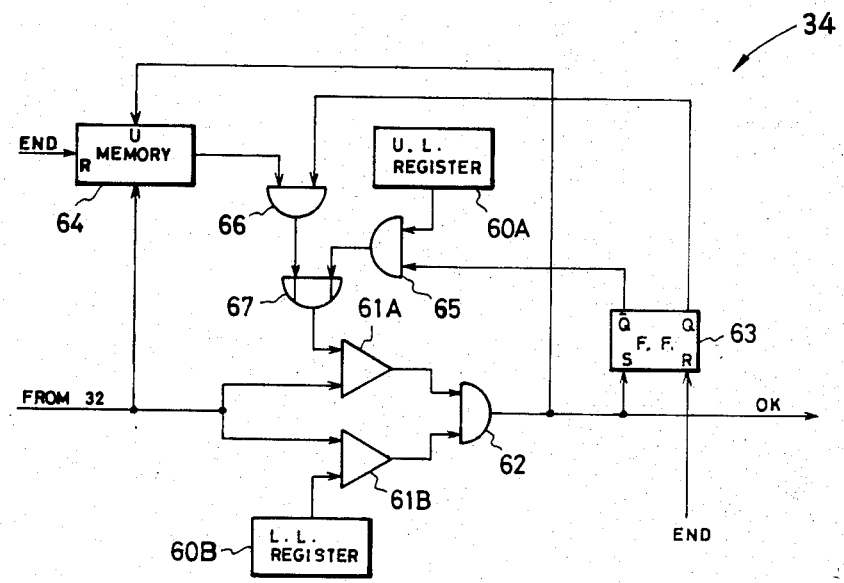
FIG. 3 is a block diagram representing an embodiment of the judging circuit in FIG. 2.
Figure 4:
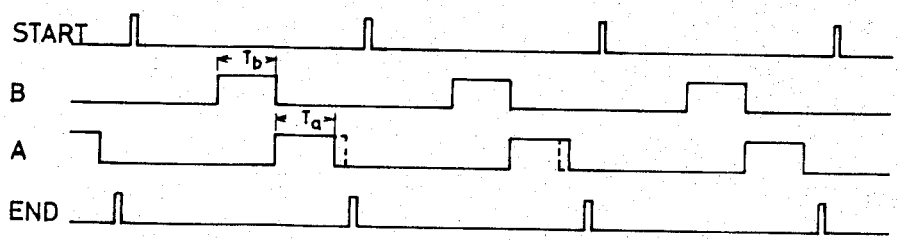
FIG. 4 is a timing signal diagram presented in aid of explaining operation of the circuit of FIG. 2.

An example of the judging circuit 34 is shown in FIG. 3. The circuit 34 includes upper and lower limit registers 60A and 60B in which the upper and lower limits of the predetermined allowable range of weight are preset, respectively, by means of a digital keyboard, for example. The circuit 34 also includes a pair of comparators 61A and 61B coupled to receive the output signals of the registers 60A and 60B at their first inputs, respectively, and the total weight signal from the summing circuit 32 at their second inputs. The first comparator 61A is arranged to produce an output signal when its first input signal is greater than its second input signal, while the second comparator 61B is arranged to produce an output signal when its first input signal is less than its second input signal. The output signals of the comparators 61A and 61B are coupled to both inputs of an AND gate 62 whose output signal, which will be referred to hereinunder as the "OK signal", is coupled to the set input S of a flip-flop circuit 63 and the update input U of a memory 64 and also supplied to external circuits as described later. The memory 64 is coupled to receive the total weight indicative signal from the summing circuit 32 and arranged to update its content with the current input signal in response to the OK signal at its update input U. The outputs of the upper limit register 60A and the memory 64 are coupled to the first comparator 61A through separate AND gates 65 and 66 and a common OR gate 67, while the output of the lower limit register 60B is coupled directly to the second comparator 61B. The Q and $\overline{Q}$ outputs of the flip-flop 63 are coupled respectively to the second inputs of the AND gates 66 and 65, and the reset input of the flip-flop 63 is coupled to receive an END signal produced by a timing signal generator 42 (FIG. 2) at the end of each cycle of operation as shown in FIG. 4.

At the beginning of each cycle of operation, therefore, the flip-flop 63 is in reset condition and the AND gate 65 is opened by its high level $\overline{Q}$ output signal to couple the upper limit register 60A to the comparator 61A. Accordingly, when the total weight indicative signal supplied from the summing circuit 32 to the both comparators 61A and 61B falls between the upper and lower limits stored respectively in the upper and lower limit registers 60A and 60B, the AND gate 62 will produce an OK signal. Then, the OK signal is applied to the update input U of the memory 64 to cause it to store this total weight. The OK signal is also applied to the set input S of the flip-flop 63 to set it, thereby closing the AND gate 65 and opening the AND gate 66. Thus, the content of the memory 64 is applied through the gates 66 and 67 to the comparator 61A as a new upper limit, while the lower limit is unchanged. If another total weight signal falling between these new limits comes in the judging circuit 34 in this condition, the AND gate 62 will produce an OK signal to cause the memory 64 to update its content with this new weight indicative signal. In the same manner, the content of the memory 64 is successively substituted with the subsequent input signal which is less than itself and gradually approaches the lower limit preset in the register 60B. Thus, at the end of each cycle of operation, just before the memory 64 is cleared by the END signal at its reset input R, it stores a total weight falling within the predetermined range of weight and being nearest of all to the lower limit thereof.

Returning to FIG. 2, the control terminals of the normally-open switches $30_1, 30_2, \ldots 30_n$ are coupled respectively to n-number of output terminals of a combination generator 36. The combination generator 36 is actuated by a START signal applied periodically from the timing signal generator 42 as shown in FIG. 4 and driven by a train of clock pulses from a clock pulse generator included therein to produce a predetermined set of combinations of output pulse signals from its selected output terminals. For example, if the predetermined set of combinations are complete mathematical combinations of the n-number of outputs, the combination generator 36 may be an n-bit binary counter having a control clock input and n-number of parallel outputs corresponding to its output terminals, respectively. In this case, logic HIGH level or binary "1" will serve as the output signal from each output terminal of the combination generator 36. As is well known in the art, the total number of such combinations is $2^n - 1$ and the combination generator 36 will produce $(2^n - 1)$ sets of output signals successively in synchronism with the applied clock pulse train. Thus, the weight indicative signals $W_1, W_2, \ldots W_n$ from the weight sensors $26_1, 26_2$, $\ldots 26_n$ are successively applied to the summing circuit 32 in accordance with these combinations.

The output signals of the combination generator 36 are also supplied successively to a combination memory 38 having corresponding input and output terminals. The combination memory 38 is also coupled to receive the OK signal from the judging circuit 34 and the END signal from the timing signal generator 42, and arranges to update its content with the current set of input signals in response to the OK signal at the same time as the memory 64 (FIG. 3) updates its content and to clear the content in response to the END signal. Accordingly, the combination memory 38 stores the selected combination of weighing units which provide the optimum total weight of articles stored in the memory 64 at the end of each cycle of operation.

In addition to the START and END signals, the timing signal generator 42 generates loading and unloading gate control timing signals A and B timed as shown in FIG. 4. Pulse durations Ta and Tb of these signals can be preset manually in the generator 42 by any suitable means (not shown) well-known in the art.

The combination memory 38 is also arranged to discharge its content in response to the timing signal B for the preset time Tb. The discharged content of the memory 38 is applied as the effective unloading gate control signals $B_1, B_2, \ldots B_n$ to the selected weighing units to open their unloading gates 20 (FIG. 1) and also stored in a second combination memory 40. The combination memory 40 is also arranged to discharge its content in response to the timing signal A for the preset time Ta and to clear the content in response to the END signal. However, as shown in dashed lines in FIG. 4, the pulse duration Ta or the duty cycle of the timing signal A is controlled by a duration control circuit 44, as described later in accordance with this invention. The discharged content of the memory 40 is applied as the effective loading gate control signals $A_1, A_2, \ldots A_n$ to the selected weighing units to open their loading gates 16 (FIG. 1).

A loading detector 46 is suitably coupled to the holding circuits $28_1, 28_2, \ldots 28_n$ as shown in dashed lines in order to detect the presence of the weight signals $W_1, W_2, \ldots W_n$ in all of them. Upon detection of this state, the detector 46 produces a control signal pulse which is applied to the normally-open switches $30_1, 30_2, \ldots 30_n$ and an additional normally-open switch 48 to close them. The normally-open switch 48 is inserted between the output of the summing circuit 32 and a first input of a subtracter circuit 52 whose second input is coupled from a total weight register 50. The register 50 has a suitable input device, such as digital keyboard (not shown), and is arranged to store a predetermined reference total weight of all weighing units. While this reference weight may be selected as twice the target weight of each "pack" of particles for the purpose of satisfying the aforementioned "half number" condition, it may be selected otherwise for other specific purpose. The sum signal from the summing circuit 32 is subtracted from the reference weight signal by the subtracter 52 to produce a positive or negative deviation indicative signal. This signal is applied as a control signal to the duration control circuit 44 as indicated at A to control the duration Ta of the output timing pulse A in accordance with its polarity and magnitude so that the amount of articles fed to the each unloaded weighing unit is controlled so as to minimize the magnitude of the deviation indicative signal.

In the above embodiment, the loading detector 46 detects the "full-loaded" state just after the loading step and produces a control signal to close all normally-open switches $30_1, 30_2, \ldots 30_n$ at the same time, independently of the control signals from the combination generator 36, for obtaining the total weight from the summing circuit 32. Therefore, it is desired to time the operation procedure such that this loading control step is completed well before the combination generator 36 initiates its operation so as not to disturb the combination operation.

As another embodiment, the loading detector 46 may be arranged to detect the total sum of all weighing units which appears once in the summing circuit 32 during each combination cycle. In this case, the normally-open switches 30 need not be controlled by the loading detector 46.

Other variations and modifications can be made in many ways by those skilled in the art within the scope of this invention as defined in the appended claims. For example, instead of controlling the loading gates 16, the amplitude of vibration of the vibrator 12 may be controlled to control the feeding rate of articles by coupling the deviation signal from the subtracter 52 appropriately to a vibrator control device (not shown). While the judging circuit of FIG. 3 is arranged to make the sum weight as near as possible to the lower limit of the allowable range in accordance with common request of vendors, various type of judging circuits can be adopted as occasion demands as described in the copending U.S. application Ser. No. 323,951 filed Nov. 23, 1981, now U.S. Pat. No. 4,416,341 for example. Though the detailed circuit configurations of the components 42, 44 and 46 have not been described, they will be self-evident for those skilled in the art and are not the subjects of this invention.

I claim:

1. A combination weighing machine, comprising a plurality of weighing units for weighing a plurality of articles each and producing weight indicative signals, respectively; combination selecting means for summing said weight indicative signals in accordance with a predetermined set of combinations and electing a combination which provides a sum weight meeting a predetermined qualification; and an automatic feeding device for feeding the articles to said weighing units; wherein said machine further comprises detecting means for detecting the fact that all of said weighing units are producing said weight indicative signals and thereafter causing said weight indicative signals to be supplied to said combination selecting means, said combination selecting means producing a signal indicative of their total weight prior to summing said weight indicative signals in accordance with a predetermined set of combinations; comparing means for comparing said total weight indicative signal with a signal indicative of a predetermined reference weight to produce a signal indicative of the deviation therebetween; and control means for controlling said automatic feeding device in response to said deviation indicative signal to adjust its feeding rate so as to minimize said deviation.

2. A combination weighing machine, according to claim 1, wherein said combination selecting means include a plurality of normally-open switches coupled respectively to the signal outputs of said weighing units and switched in accordance with said predetermined set of combinations, and a summing circuit coupled to the outputs of said switches for summing said weight indicative signals supplied through said switches to produce a signal indicative of said sum weight; and said detecting means includes a detector for detecting the fact that all of said weighing units are producing said weight indicative signals, and produce an output signal and supplying said output signal to all of said normally-open switches as their switching control signal to close them, and an additional normally-open switch inserted between said summing circuit and said comparing means and closed in response to said output signal of said detector to supply to said comparing means said total weight indicative signal currently produced by said summing circuit.

3. A combination weighing machine, according to claim 1 wherein said automatic feeding device includes means controlled respectively with an input control pulse to feed said articles in accordance with the duration of said pulse, and said control means are adapted to control the duration of said control pulse in response to said deviation indicative signal.

4. A combination weighing machine, according to claim 1, 2 or 3, wherein said predetermined reference weight is substantially equal to twice said sum weight meeting said predetermined qualification.

5. Combination weighing apparatus comprising a plurality of weighing units, means for feeding product to said units at a variable rate, means for determining the values of combinations of weights on said units to select a combination of units to be unloaded to deliver an acceptable weight quantity, means for determining the total weight of product on all the units prior to said means for determining the values of combinations of weights selecting a combination, and means for varying the rate of feed of product by said feeding means in response to the total weight determination for loading the units with such weights as to provide for selection of at least a predetermined number less than all of said units to be unloaded.

6. Combination weighing apparatus as set forth in claim 5 wherein the means for varying the rate of feed is operable to provide for selection of one-half of the units.

7. Combination weighing apparatus comprising a plurality of weighing units, means for feeding product to said units at a variable rate, means for determining the values of combinations of weights on said units to select a combination of units to be unloaded to deliver an acceptable weight quantity, means for determining the total weight of product on all the units prior to said means for determining the values of combinations of weights selecting a combination, and means for varying the rate of feed of product by said feeding means in response to the total weight determination for loading the units with a total weight which is a predetermined fraction of the acceptable weight quantity.

8. Combination weighing apparatus as set forth in claim 7 wherein the units are loaded with about one-half the acceptable weight quantity.

9. Combination weighing apparatus as set forth in claim 8 wherein the means for varying the rate of feed is operable to provide for selection of one-half of the units.

10. A combination weighing machine, comprising a plurality of weighing units for weighing a plurality of articles each and producing weight indicative signals, respectively; combination selecting means for summing said weight indicative signals in accordance with a predetermined set of combinations and electing a combination which provides a sum weight meeting a predetermined qualification; and an automatic feeding device for feeding the articles to said weighing units; wherein said machine further comprises detecting means for detecting the fact that all of said weighing units are producing said weight indicative signals, thereafter summing said weight indicative signals and producing a signal indicative of their total weight prior to said combination selecting means summing said weight indicative signals in accordance with a predetermined set of combinations; comparing means for comparing said total weight indicative signal with a signal indicative of a predetermined reference weight to produce a signal indicative of the deviation therebetween; and control means for controlling said automatic feeding device in response to said deviation indicative signal to adjust its feeding rate so as to minimize said deviation.

* * * * *